United States Patent
Campbell et al.

(10) Patent No.: US 7,711,440 B1
(45) Date of Patent: May 4, 2010

(54) BROWSER BASED EMBEDDED HISTORIAN

(75) Inventors: John T. Campbell, Bridgeville, PA (US); Robert J. McGreevy, Oswego, IL (US); Robert J. Herbst, Aurora, OH (US); John J. Baier, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 349 days.

(21) Appl. No.: 11/536,545

(22) Filed: Sep. 28, 2006

(51) Int. Cl.
 *G05B 11/01* (2006.01)
(52) U.S. Cl. ............................................. 700/19; 707/3
(58) Field of Classification Search ................... 700/11, 700/17, 19, 32, 48, 108, 169, 173; 707/3, 707/102

See application file for complete search history.

(56) References Cited

U.S. PATENT DOCUMENTS

| | | | |
|---|---|---|---|
| 4,553,205 | A | 11/1985 | Porchia |
| 4,616,333 | A | 10/1986 | Shimoni |
| 4,718,025 | A | 1/1988 | Minor et al. |
| 4,975,865 | A | 12/1990 | Carrette et al. |
| 5,003,469 | A | 3/1991 | Kamiyama et al. |
| 5,051,932 | A | 9/1991 | Inove et al. |
| 5,274,781 | A | 12/1993 | Gibart |
| 5,452,201 | A | 9/1995 | Pieronek et al. |
| 5,805,442 | A | 9/1998 | Crater et al. |
| 5,943,675 | A | 8/1999 | Keith et al. |
| 6,110,214 | A | 8/2000 | Klimasauskas |
| 6,139,201 | A | 10/2000 | Carbonell et al. |
| 6,204,782 | B1 | 3/2001 | Gonzalez et al. |
| 6,252,589 | B1 | 6/2001 | Rettig et al. |
| 6,263,487 | B1 | 7/2001 | Stripf et al. |
| 6,298,393 | B1 | 10/2001 | Hopsecger |
| 6,411,987 | B1 | 6/2002 | Steger et al. |
| 6,505,247 | B1 * | 1/2003 | Steger et al. ............... 709/224 |
| 6,536,029 | B1 | 3/2003 | Boggs et al. |
| 6,539,271 | B2 | 3/2003 | Lech et al. |

(Continued)

FOREIGN PATENT DOCUMENTS

EP 0490864 6/1992

(Continued)

OTHER PUBLICATIONS

"Major Canadian Natural Gas Producer Buys AnyWhere/AnyTime Services from Industrial Evolution"; Mar. 12, 2001; Industrail Evolution; pp. 1.*

(Continued)

*Primary Examiner*—Ramesh B Patel
*Assistant Examiner*—Chad Rapp
(74) *Attorney, Agent, or Firm*—Turocy & Watson LLP; William R. Walbrun; John M. Miller

(57) ABSTRACT

Systems and methods that enable query based formulation requests to an embedded historian and data acquired thereby, via employing a browser engine. Accordingly, users can browse data collected by the plurality of embedded historians based on numerous selection criteria such as for example, type of data collected, location/time of data collection, and the like. Query specific request can be inputted to the browser engine, and data that match such request can subsequently be presented to the user. Thus, history data can be viewed based on user preferences, and in a meaningful manner to such user.

30 Claims, 10 Drawing Sheets

U.S. PATENT DOCUMENTS

| | | |
|---|---|---|
| 6,559,861 B1 | 5/2003 | Kennelly et al. |
| 6,574,639 B2 * | 6/2003 | Carey et al. ............... 707/104.1 |
| 6,618,856 B2 | 9/2003 | Coburn et al. |
| 6,633,782 B1 | 10/2003 | Schleiss et al. |
| 6,754,668 B2 | 6/2004 | Noble et al. |
| 6,754,885 B1 | 6/2004 | Dardinski et al. |
| 6,795,798 B2 | 9/2004 | Eryurek et al. |
| 6,799,148 B2 | 9/2004 | Ling et al. |
| 6,847,850 B2 | 1/2005 | Grumelart |
| 6,952,727 B1 | 10/2005 | Lindner et al. |
| 6,975,913 B2 | 12/2005 | Kreidler et al. |
| 7,043,311 B2 | 5/2006 | Nixon et al. |
| 7,069,201 B1 | 6/2006 | Lindner et al. |
| 7,181,370 B2 | 2/2007 | Furem et al. |
| 7,206,646 B2 | 4/2007 | Nixon et al. |
| 7,206,965 B2 | 4/2007 | Roddy et al. |
| 7,218,974 B2 | 5/2007 | Rumi et al. |
| 7,228,310 B2 | 6/2007 | O'Brien |
| 7,249,356 B1 | 7/2007 | Wilson et al. |
| 7,275,062 B2 | 9/2007 | Deitz et al. |
| 7,286,888 B2 | 10/2007 | Monette et al. |
| 7,299,367 B2 | 11/2007 | Hamm et al. |
| 7,328,078 B2 | 2/2008 | Sanford et al. |
| 7,359,930 B2 | 4/2008 | Jackson et al. |
| 7,574,417 B1 | 8/2009 | McGreevy et al. |
| 2002/0133523 A1 | 9/2002 | Ambler et al. |
| 2002/0174263 A1 | 11/2002 | Codd et al. |
| 2003/0014130 A1 * | 1/2003 | Grumelart .................... 700/28 |
| 2003/0041135 A1 * | 2/2003 | Keyes et al. ................ 709/223 |
| 2003/0101208 A1 | 5/2003 | Chauvel et al. |
| 2003/0172107 A1 | 9/2003 | Leyfer et al. |
| 2003/0182303 A1 | 9/2003 | Gibson |
| 2004/0153437 A1 | 8/2004 | Buchan |
| 2004/0181294 A1 | 9/2004 | Deitz et al. |
| 2005/0198034 A1 | 9/2005 | Boyer |
| 2005/0198406 A1 | 9/2005 | Sichner |
| 2005/0210337 A1 | 9/2005 | Chester et al. |
| 2006/0004827 A1 | 1/2006 | Stuart |
| 2006/0020928 A1 | 1/2006 | Holloway et al. |
| 2006/0026559 A1 | 2/2006 | Gunturi et al. |
| 2006/0067334 A1 | 3/2006 | Ougarov et al. |
| 2006/0291283 A1 | 12/2006 | Jin et al. |
| 2006/0294502 A1 | 12/2006 | Das et al. |
| 2007/0028070 A1 * | 2/2007 | Avergun et al. ............. 711/172 |
| 2007/0050348 A1 * | 3/2007 | Aharoni et al. ................ 707/4 |
| 2007/0073744 A1 | 3/2007 | McVeigh et al. |
| 2007/0112447 A1 | 5/2007 | McGreevy et al. |
| 2007/0112801 A1 | 5/2007 | McGreevy et al. |
| 2007/0136533 A1 | 6/2007 | Church et al. |
| 2007/0142941 A1 | 6/2007 | McGreevy et al. |
| 2007/0156770 A1 | 7/2007 | Espelien |
| 2007/0244964 A1 | 10/2007 | Challenger et al. |
| 2007/0282577 A1 | 12/2007 | Lind |
| 2007/0288795 A1 | 12/2007 | Leung et al. |
| 2008/0027678 A1 | 1/2008 | Miller |
| 2008/0082577 A1 | 4/2008 | Hood et al. |
| 2008/0126408 A1 * | 5/2008 | Middleton ............... 707/104.1 |

FOREIGN PATENT DOCUMENTS

| | | | |
|---|---|---|---|
| EP | 1109107 | | 6/2001 |
| EP | 1307823 | | 5/2003 |
| GB | 2347234 | * | 2/2000 |
| GB | 2353616 A1 | | 2/2001 |
| WO | 2004027531 A1 | | 4/2004 |
| WO | 2005006130 A | | 1/2005 |
| WO | 2005006130 A3 | | 1/2005 |

OTHER PUBLICATIONS

"Real Time Intelligence at the Source-Deploying and EMbedded Historian"; 2005; Users Conference; pp. 1.*
Miller et al. "Extending the Reach of Enterprise Data Management in a World of M2M"; Oct. 2005; ISA EXPO; pp. 1-7.*
"Proficy Historian"; Dec. 16$^{th}$, 2004; GE FANUC; pp. 1-8.*
"Major Canadian Natural Gas Producer Buys AnyWhere/AnyTime Services from Industrial Evolution" Mar. 12, 2001, Industrial Evolution pp. 1.
Real Time Intelligence at the Source-Deploying and EMbedded Historian. Users Conference 2005, pp. 1.
Miller, et al. "Extending the Reach of Enterprise Data Management in a World of M2M." ISA EXPO. Oct. 2005, pp. 1-7.
"Proficy Historian"; Dec. 16, 2004, GE FANUC, pp. 1-8.
European Search Report dated Feb. 22, 2008 for European Patent Application Serial No. EP 07 11 7388, 1 Page.
European Search Report dated Jan. 20, 2009 for European Patent Application No. EP08156281, 6 Pages.
EP Office Action for Application No. 08165215.8-1243 dated Mar. 3, 2009, 2 pages.
European Search Report and Written Opinion for European Application No. EP 08 16 5215, dated Dec. 8, 2008, 6 pages.
Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.
Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.
European Search Report dated Feb. 5, 2008 for European Patent Application No. EP07117614, 8 pgs.
Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.
European Search Report dated May 2, 2008 for European Patent Application No. EP07117622, 2 pgs.
Power RICH System, Enterprise Edition, Historian (PRS EE Historian) Version 1.5, last accessed Dec. 3, 2008, 15 pages.
Wonderware Plant Intelligence Solution Helps Arla Foods Deliver Fresh Milk Products to the Tables of Europe. Last accessed Dec. 3, 2008, 4 pages.
European Search Report dated Dec. 18, 2007 for European Patent Application Serial No. 07117364.5-2221, 2 Pages.
OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul. 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.
OA dated Jan. 26, 2009 for U.S. Appl. No. 11/536,535, 40 pages.
OA dated Jul. 23, 2008 for U.S. Appl. No. 11/536,535, 31 pages.
OA dated Dec. 3, 2008 for U.S. Appl. No. 11/536,566, 35 pages.

* cited by examiner

BROWSER BASED EMBEDDED HISTORIAN

TECHNICAL FIELD

The subject invention relates generally to historian components associated with industrial controllers and more particularly to browsing data of such embedded historian components and data type collected thereby.

BACKGROUND

Manufacturing control and monitoring modules typically produce significant amounts of data. Industrial controller produce both real-time and historical data about the status of a given process including alarms, process values, and audit/error logs. Typically, industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, imperative to factory automation are human-machine interfaces (HMIs), which can include a graphical user interface (GUI) to facilitate display of virtual software objects that represent industrial system components and/or actions. For example, such an implementation can be typically configured to allow a HMI to graphically display process points (I/O of physical devices) desirably controlled by a user. Moreover, when data from controllers and industrial modules are typically collected via embedded historians that are directly connected to the controllers, problems can arise, as such historians typically lack a suitable presentation feature to represent data into other visualization applications.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation enables query based formulation requests to an embedded historian and data acquired thereby, via employing a browser engine. In general, such embedded historians (unlike conventional PC historians) supply a direct interface to controllers without employing a transitional layer, and hence provide a substantially higher data exchange rate as compared to conventional PC historians. Accordingly, users can browse data collected by the plurality of embedded historians based on numerous selection criteria such as for example, type of data collected, location/time of data collection, and the like. Hence, query specific request can be inputted to the browser engine, and data that match such request can subsequently be presented to the user. Thus, history data can be viewed based on user preferences (e.g., and in a meaningful manner to such user).

When interacting with such browser engine, data requests/filtering related to historian data can be non-time based (e.g., based on other parameters such as location, data model contextual type, and the like), and not necessary based on what the controller is configured for. Such can further enable transparency among a plurality of embedded historians, wherein data can then be correlated among them.

In a related aspect, the browsing engine can further allows user(s) to visually browse data associated with the embedded historians, based in part on associated metadata, and hence providing a meaningful manner for browsing of data collected by such embedded historians. Furthermore, the browsing component can group related embedded historian data into cluster(s) based, at least in part, upon the metadata associated with the historian data.

According to a further aspect, a query component associated with the browsing component is supplied, which can employ a query comprehension represents a concise and compositional expression of a query, to designate desired history data for viewing. A translation component of the query component can further operate to translate a query comprehension into an expression specified with operators.

In a related methodology of the subject innovation, a user can select a pre-determined display/browsing criteria for viewing of data. The display criteria can for example be based on a predetermined standard; for example such as identifying the embedded historian that has collected the data, type of data that has been collected, time of collection, industrial unit that such data was collected, industrial parameters, and the like. In addition, such display criteria can also be designated as part of a query submitted to the browser component of the subject innovation.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
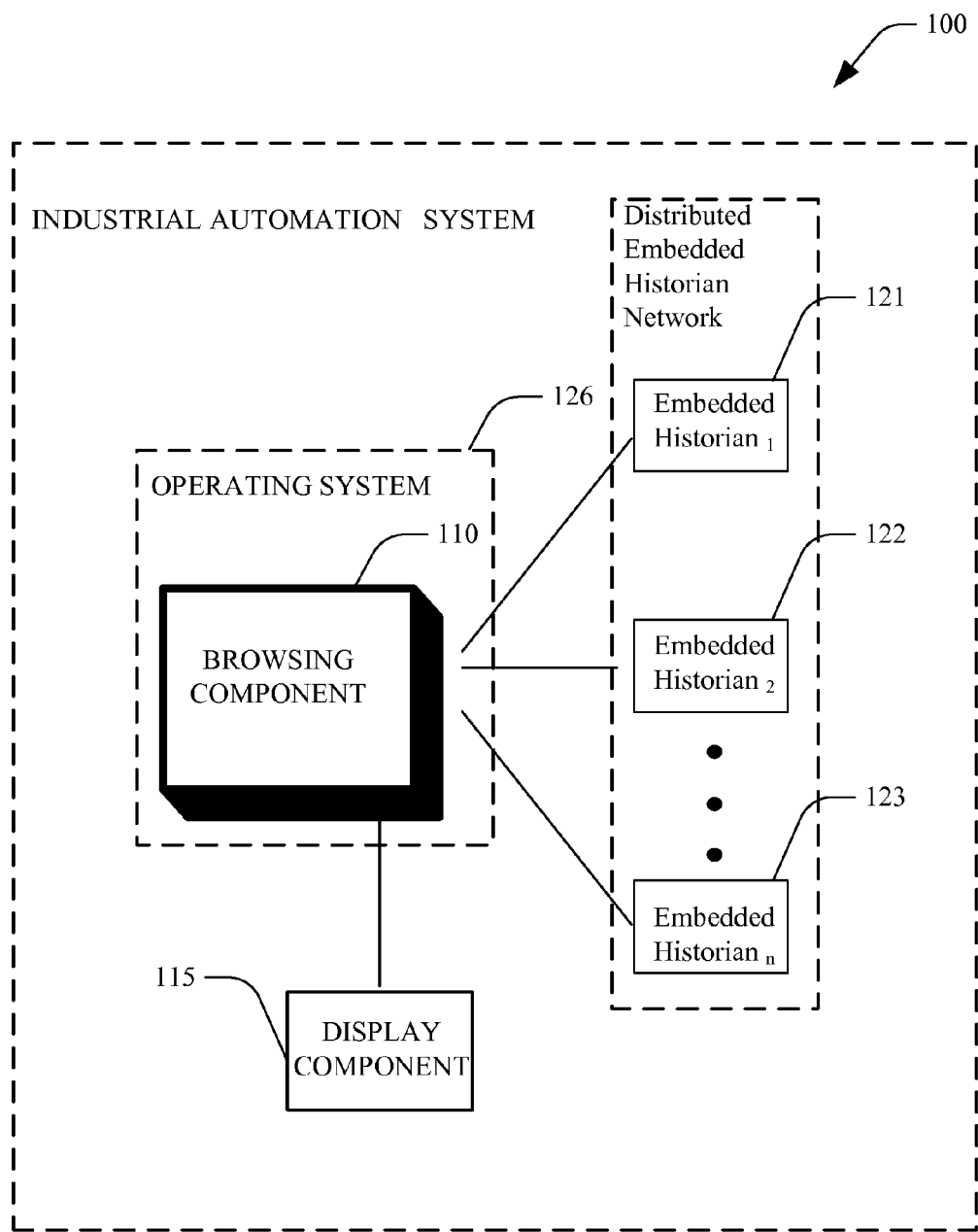
FIG. 1 is a schematic block diagram of an industrial automation system with a browser component to browse history data that is collected by a plurality of embedded historians, in accordance with an aspect of the subject innovation.

FIG. 1 illustrates a browser component 110 that is associated with a plant embedded historian network of an industrial programmer system 100 (e.g., a network of controller devices), to facilitate accessing/viewing data collected by the embedded historians 121, 122, 123 (1 to N, N being an integer). For example, the browser component 110 can represent data collected by the embedded historians via a display component 115; such as, a computer screen, a monitor, an liquid crystal display (LCD), a monitor, a flat-panel, a computer monitor, a television, a plasma screen, a touch-screen, and a portable digital assistant (PDA), and the like. In contrast to conventional PC historians, embedded historians (e.g., micro historians) of the subject innovation are special purpose historians that reside in a backplane and supply direct interface (e.g., without a transition layer) to controllers and/or associated industrial units. Such embedded historians employ industrial specifications (e.g., regarding shock vibration, sealing, contamination proofing, and the like), and supply substantially higher data exchange speed as compared to conventional PC historians.

An operating system 126 can host the browser component 110 to enable rendering and/or display of history data. Such operating system 126 can include any suitable operating system that employs a graphical user interface. The browser component 110 can be part of applications running on a control unit (not shown), which can function as a management control center for the industrial network system 100. Accordingly, a distributed embedded historian framework is provided, wherein a plurality of historical data types can be stored, collected, viewed and subsequently searched via queries submitted to the browser component 110, as described in detail infra.

Furthermore, the operating system 126 can employ the browser component 110 in conjunction with various layered windows technology—(the term windows can refer to a visual area containing some type of user interface, displaying the output of and allowing input for one of a number of simultaneously running computer processes, for example). The browser component 110 can be hosted by the operating system 126, to display the historian data and other graphical item. Moreover, the system 100 can include any suitable interface component to supply various adapters, connectors, channels, communication paths, and the like to avail the historians for access by the browser component 110.

A network system (not shown) can be associated with the industrial automation system 100, and can be employed by the browser component 110. The network system can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. Moreover, the network system can be, for example, an Ethernet LAN, a token ring LAN, or other LAN, or Wide Area Network (WAN). Also, the network system can include hardwired and/or optical and/or wireless connection paths. The download engine 110 can supply data exchange between the micro historians and the central plant historian, to supply information such as: portions of the data that are to be downloaded to the central plant historian, from each of the micro historians.

It is noted that as used in this application, terms such as "engine" "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 2:
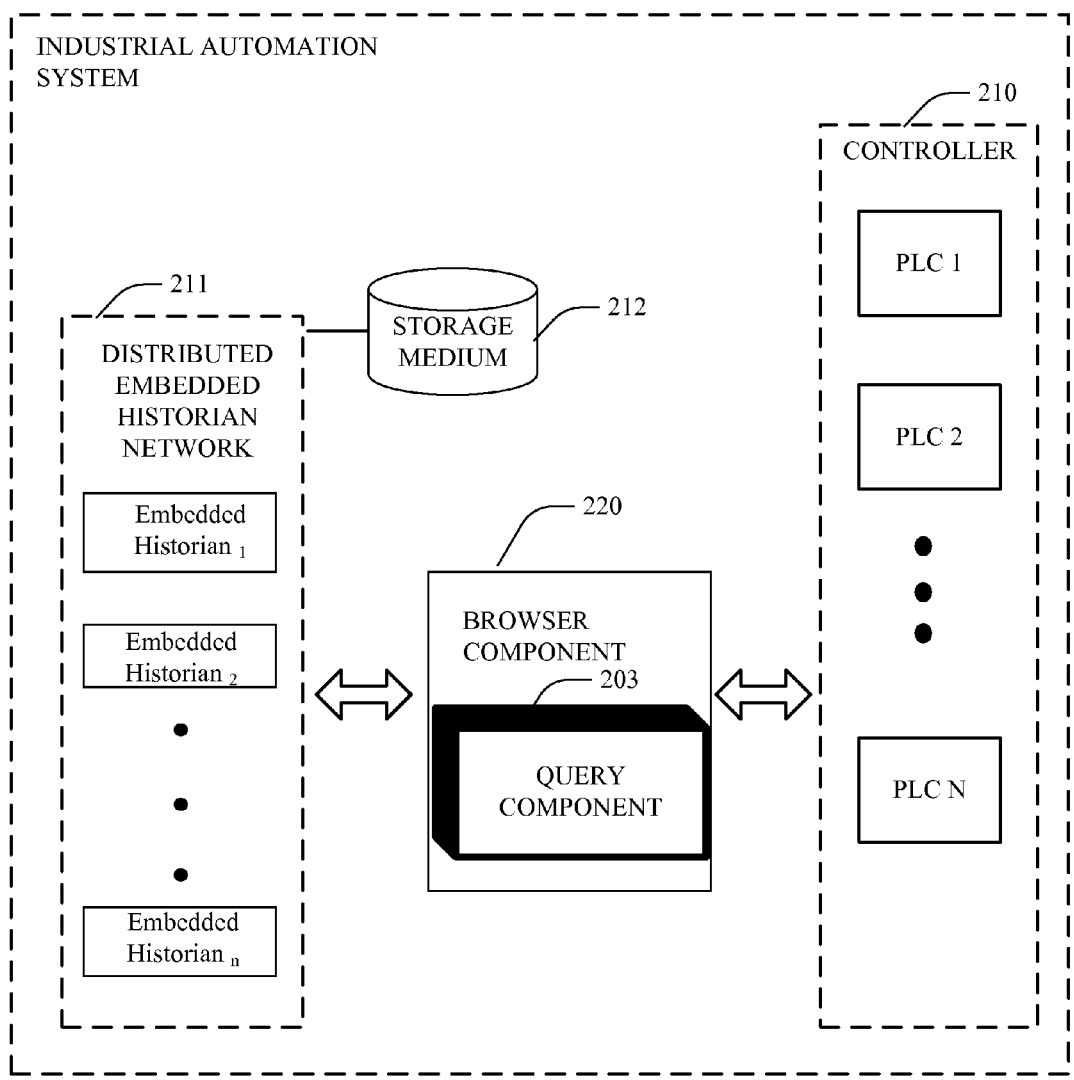
FIG. 2 illustrates query component that is associated with the browser component in accordance with a particular aspect of the subject innovation.

FIG. 2 illustrates a query component 215 that is associated with the browser component 220 in accordance with an aspect of the subject innovation. History data collected by the embedded historians 211 can be organized in a systematic manner and persisted to a storage medium 212. The data can be structured according to a variety of methods or models. For example, a hierarchical data model can be employed to associates data with a record and places the records in a tree data structure, such that each record is owned by only one entity. Moreover, various relational database model can be employed in the wherein mathematical relations based on set theory and predicate logic represent the data. Such organized nature of the storage medium 212 data enables computer programs to retrieve answers to queries readily and efficiently. For example, data that are collected by the embedded historian 211 can be viewed by the browser component 220 computer programs can create, manipulate and retrieve data from a database utilizing a query.

In general, the query component 203 can receive, retrieve or otherwise acquire or obtain one or more query comprehensions, wherein a query comprehension represents a concise and compositional expression of a query for viewing history data. For example, such compositionality can facilitate parsing queries forwarded to the query component 203, to view desired data collected by the embedded historians 211. In another example, the browser component 220 can implement query comprehensions such as SQL (structured query language) or similar SQL style format.

Figure 3:
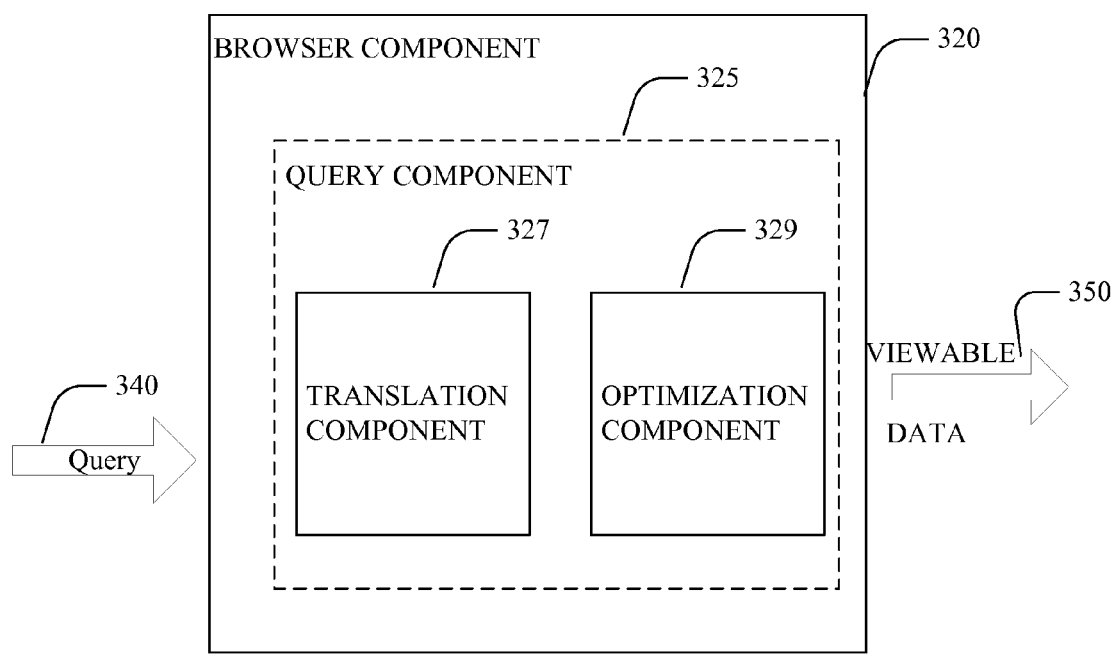
FIG. 3 illustrates a general block diagram of a browser component that further includes a translation component and an optimization component in accordance with an aspect of the subject innovation.

FIG. 3 illustrated a browser component 320 that has a query component 325, which includes a translation component 327 and an optimization component 329 in accordance with an aspect of the subject innovation. The translation component 320 operates to translate a query comprehension into an expression specified with operators. As a result, the query comprehension can be specified concisely at a high level and translated to a more expansive and primitive expression that represents the semantics of the query comprehension. Likewise, the optimization component 329 can be employed by the translation component 327 to facilitate generation of a translated query comprehension that is optimal in terms of execution. For example, when different operators are employed to capture the semantics of the query comprehension, the optimization component can supply an efficient execution, via reorganizing, grouping, ungrouping, or otherwise manipulating an operator expression to produce an efficient expression for execution. Accordingly, queries can be supplied to identify history data for viewing by the browser component based on a plurality of criteria such as; type of history data, time of collection, industrial unit that such data was collected, industrial parameters, and the like. Query specific request 340 can be inputted to the query component 325, and data 350 that match such request can subsequently be presented to the user. Thus, history data can be viewed based on user preferences (e.g., and in a meaningful manner to such user).

Figure 4:
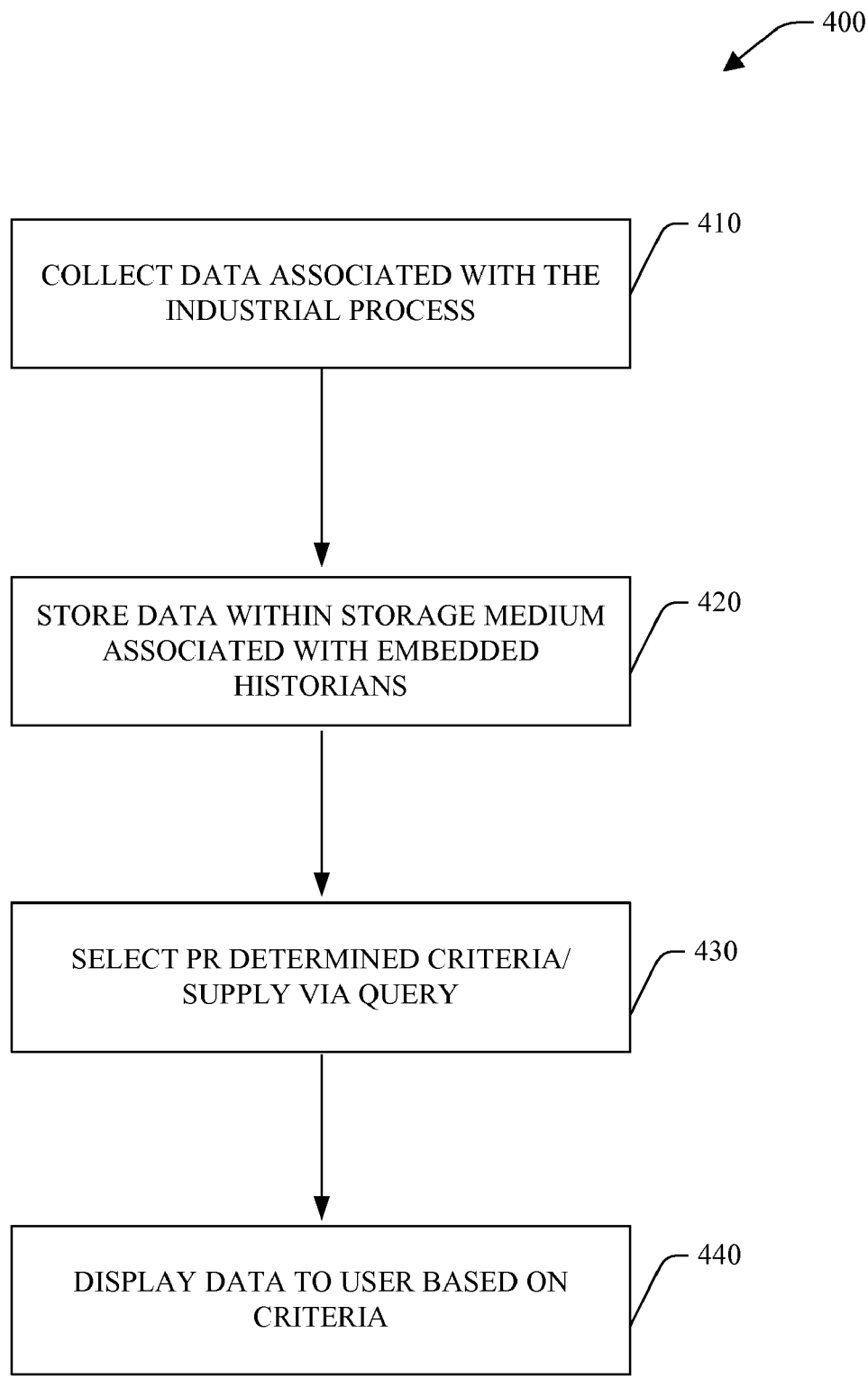
FIG. 4 illustrates a methodology of browsing data collected by a plurality of embedded historians in accordance with an aspect of the subject invention.

FIG. 4 illustrates a related methodology 400 of browsing data by a browser engine in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Initially and at 410, a plurality of embedded historians within the industrial plant can collect data that is related to an industrial operation. Such collected data can subsequently be stored to a storage medium, which employs a hierarchical data model that associates data with a record and places the records in a tree data structure. Next, and at 430 a user can select a pre-determined display criteria for viewing of data. The display criteria can for example be based on a predetermined criteria; for example such as identifying the embedded historian that has collected the data, type of data that has been collected, time of collection, industrial unit that such data was collected, industrial parameters, and the like. In addition, such display criteria can also be designated as part of a query submitted to the browser component of the subject innovation. Next, and at 440 data can be displayed to the user based on the selected criteria.

Figure 5:
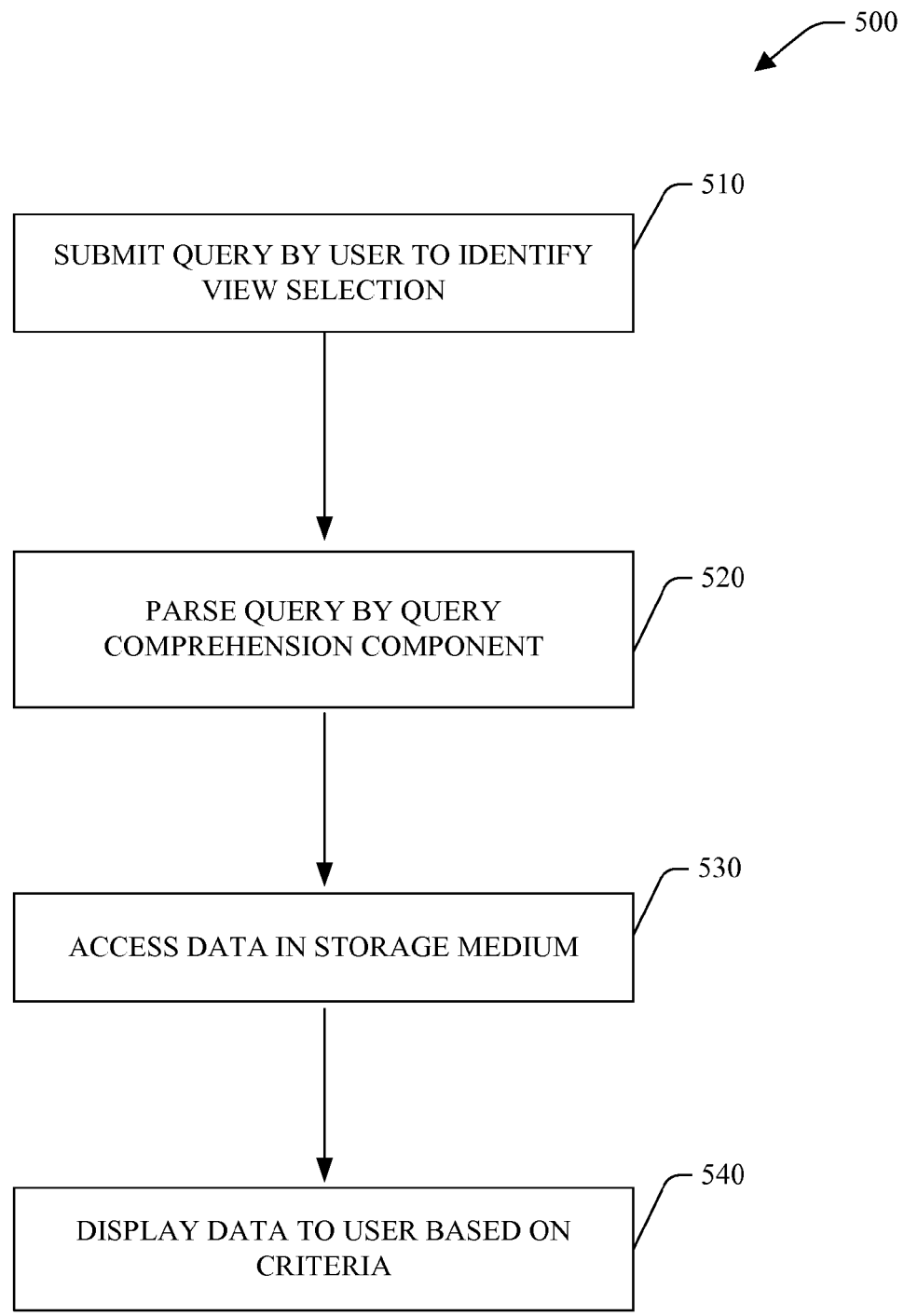
FIG. 5 illustrates a related methodology of viewing history data in accordance with an aspect of the subject innovation.

FIG. 5 illustrates a related methodology 500 of viewing data in accordance with an aspect of the subject innovation. Initially and at 510 a query is submitted that identifies type of history data that a user seeks to view (e.g., data from a particular embedded historian, data for a specific time period, and the like). Next and at 520, such query is then parsed by a query comprehension component as described in detail supra. Based on such parsing, history data in the storage medium can be accessed at 530. The selected data can then be displayed to the user at 540. Accordingly, when interacting with the browser component of the subject innovation, data requests/filtering related to historian data can be non-time based (e.g., based on other parameters such as location, data model contextual type, and the like), and not necessary based on what the controller is configured for. Such can further enable transparency among a plurality of embedded historians, wherein data can then be correlated among them.

Figure 6:
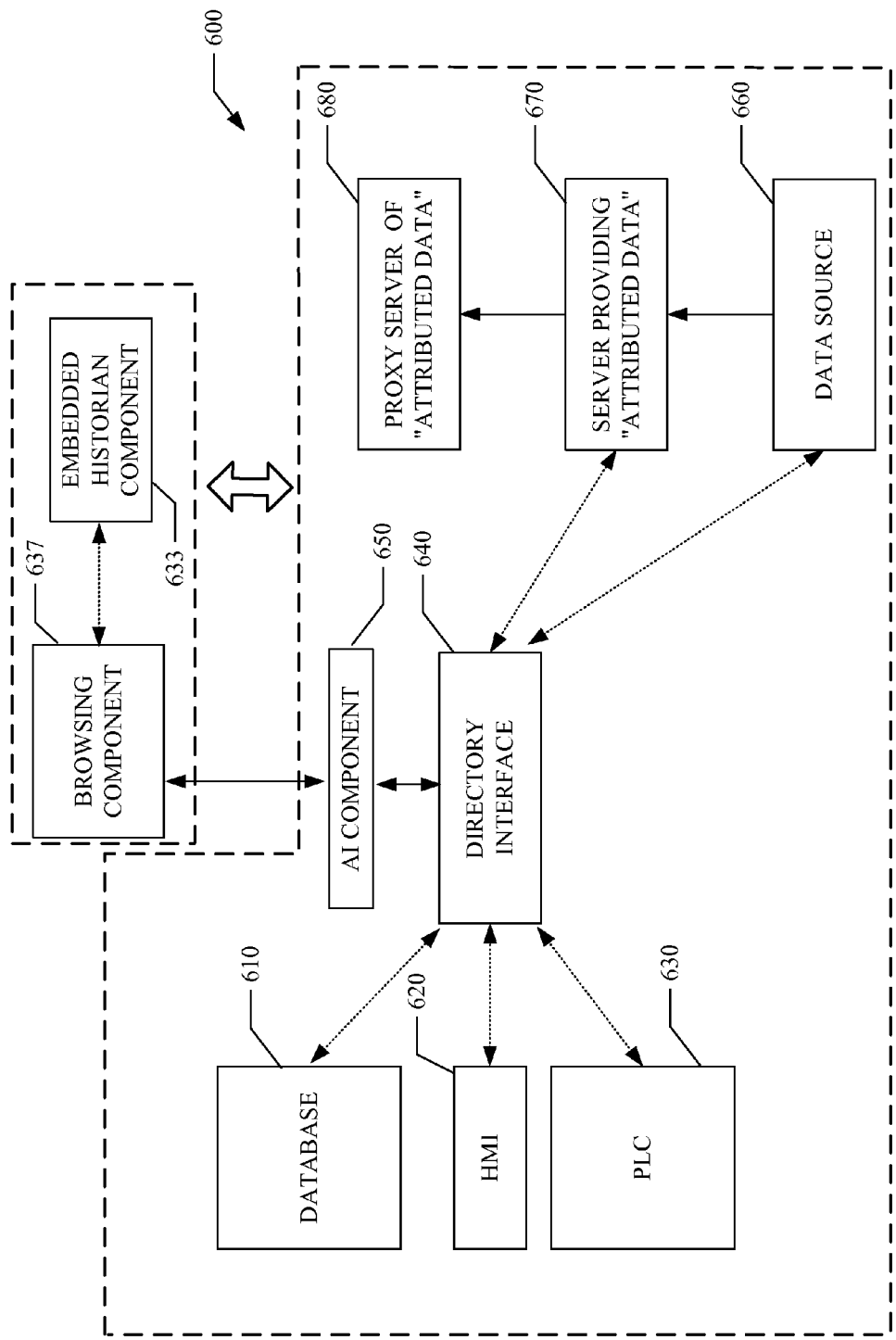
FIG. 6 illustrates an exemplary industrial automation network that employs an embedded historian component accessible by a browser component in accordance with an aspect of the subject innovation.

FIG. 6 illustrates an exemplary industrial automation network that employs a browser component 637 to interact with an embedded historian component 633, and enable query based formulation requests. The embedded historian component 633 allows for high speed data collection (e.g., real time) from the industrial setting 600, which can include a database 610, a human machine interface (HMI) 620 and a programmable logic controller (PLC) 630, and a directory interface 640. The directory interface 640 can further associate with an Artificial Intelligence (AI) component 650 to facilitate efficient browsing and/or query comprehension. For example, in connection with facilitating data display or selection of an embedded historian, the subject invention can employ various artificial intelligence schemes. A process for learning explicitly or implicitly for determining a display/browsing criteria, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). As shown in FIG. 6, an artificial intelligence (AI) component 650 can be employed to facilitate inferring and/or determining when, where, how to determine a display criteria for the plurality of embedded historians. The AI component 550 can employ any of a variety of suitable AI-based schemes as described supra in connection with facilitating various aspects of the subject invention.

Moreover, the directory interface 640 can be employed to provide data from an appropriate location such as the data source 660, a server 670 and/or a proxy server 680. Accordingly, the directory interface 640 can point to a source of data based upon role and requirements (needs) of a requester (e.g., database 610, HMI 620, PLC 630, and the like.) The database 610 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. Accordingly, particular ERP applications can require data that has certain desired attributes associated therewith. Thus, in accordance with an aspect of the subject invention, the directory interface 640 can provide data to the database 610 from the server 670, which provides data with the attributes desired by the database 610.

As illustrated in FIG. 6, the embedded historian 633 can leverage directory interface 640 and other Unified Plant Model (UPM) services to facilitate collection and browsing of history data, via the browsing component 637. Such browsing component 637 can automatically download historian data based on satisfaction of pre-defined conditions (e.g., related to storage capacity of the embedded historians) defined for the download.

Moreover, the HMI 620 can employ the directory interface 640 to point to data located within the system 600. The HMI 620 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 620 can request data to have particular visualization attributes associated with data in order to easily display such data thereto. For example, the HMI 620 can query the directory interface 640 for a particular data point that has associated visualization attributes. The directory interface 640 can determine that the proxy server 680 contains the attributed data point with the desired visualization attributes. For instance, the attributed data point can have a particular graphic that is either referenced or sent along with the data such that this graphic appears within the HMI environment instead of or along with the data value.

The PLC 630 can be any number of models such as Allen Bradley PLC5, SLC-500, MicoLogix, and the like. The PLC 630 is generally defined as a specialized device employed to provide high-speed, low-level control of a process and/or system. The PLC 630 can be programmed using ladder logic or some form of structured language. Typically, the PLC 630 can utilize data directly from a data source (e.g., data source 660) that can be a sensor, encoder, measurement sensor, switch, valve and the like. The data source 660 can provide data to a register in a PLC, and such data can be stored in the PLC if desired. Additionally, data can be updated (e.g., based on a clock cycle) and/or output to other devices for further processing.

Figure 7:
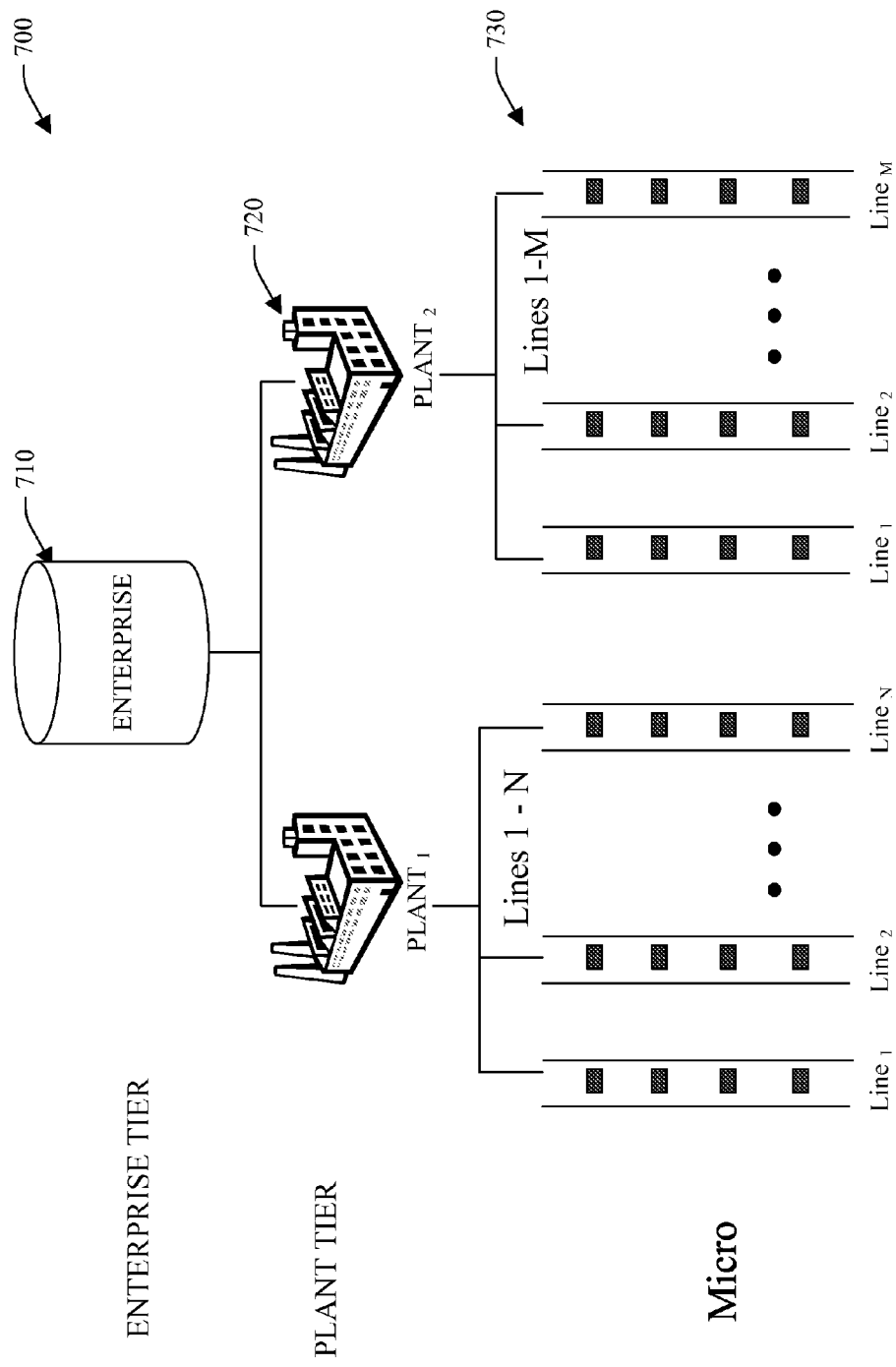
FIG. 7 illustrates an exemplary multi-tiered and distributed historian system accessible by a browser, in accordance with an aspect of the subject innovation.

FIG. 7 illustrates an exemplary multi-tiered and distributed historian system 700 that can employ a browser component, in accordance with an aspect of the subject innovation. The exemplary system 700 illustrates three tiered historian level, wherein the highest data collection tier is illustrated and can be referred to as the enterprise tier 710. This tier aggregates data collected from lower level tiers such as from a plant tier 720 and a micro or embedded tier 730. As illustrated, the tiers 710 and 720 can include archival or permanent storage capabilities. In the system 700, data can be collected from two plants at the tier 720, and from a plurality of historian components at tier 730. It is to be appreciated that such an arrangement is exemplary in nature, and other arrangements are well within the realm of the subject innovation.

Typically, the system 700 can be viewed as a Distributed Historian that spans machines, plants, and enterprises. At level 730, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, in associated networks having a low communications bandwidth. The plant level 720 aggregates data from Micro or rack-embedded historians and/or other data sources (e.g., Live Data source). Such can include plant-level querying, analytics, reporting while efficiently storing, retrieving, and managing large amounts of data. This level can also auto-discover data and data model context from Micro historians located at level 730. Other features of the system 700 can include analysis components, logical units, components for interaction with report elements, embeddable presentation components, replication of configuration, storage, archiving, data compression, summarization/filtering, security, and scalability.

Moreover, such system 700 enables combining organizational information such as an organizational or hierarchical data model which represents a common model of a plant that can be based in the S88 or S95 model, for example, and is distributed among computers of the enterprise and industrial controllers, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

Figure 8:
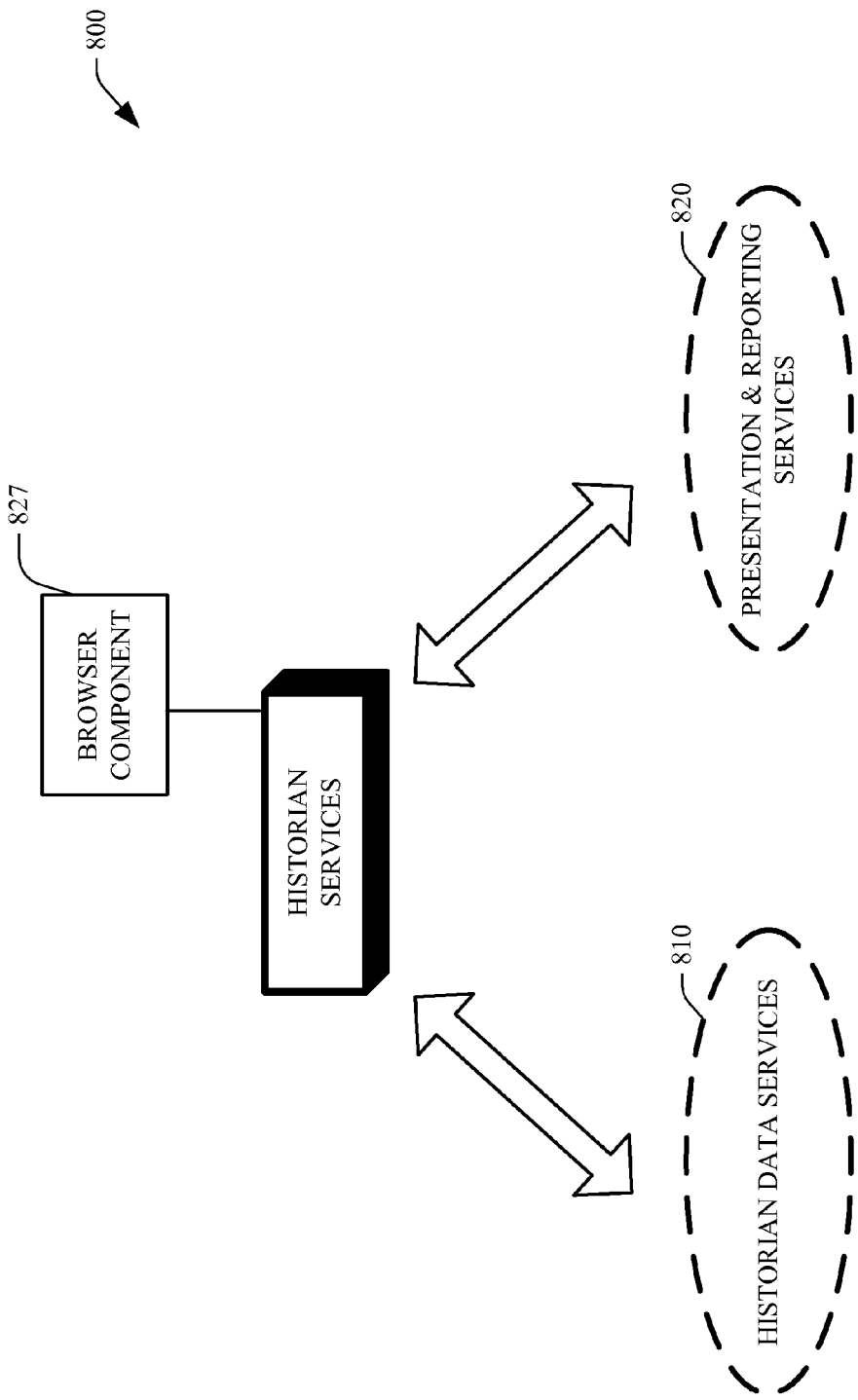
FIG. 8 illustrates historian services that include historian data services and presentation and reporting services, which can employ a browser component in accordance with an aspect of the subject innovation.

FIG. 8 illustrates historian services 800 that include historian data services 810 and presentation and reporting services 820, which can employ a browsing component 827 in accordance with an aspect of the subject innovation. Historian Data Services 810 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 820 (PRS) can supply generic, customizable services for collating and presenting data in a common plant model-defined context. This can include access to stored data, analysis/calculators and query mechanisms, and embeddable, interactive presentation components (e.g., text, charts, SPC). The service 810 can generate reports with various means of presentation/distribution (e.g., web, email) having export capabilities to standard formats (e.g., XML, Excel). The system 800 can employ a download engine as described in detail supra to download history data to a central plant historian in accordance with an aspect of the subject innovation. Additionally, a polling/publication arrangement can also be employed wherein the historians (e.g., microhistorians) identify themselves to the industrial system upon occurrence of a predetermined event, and/or periodically, for a browsing thereof.

Figure 9:
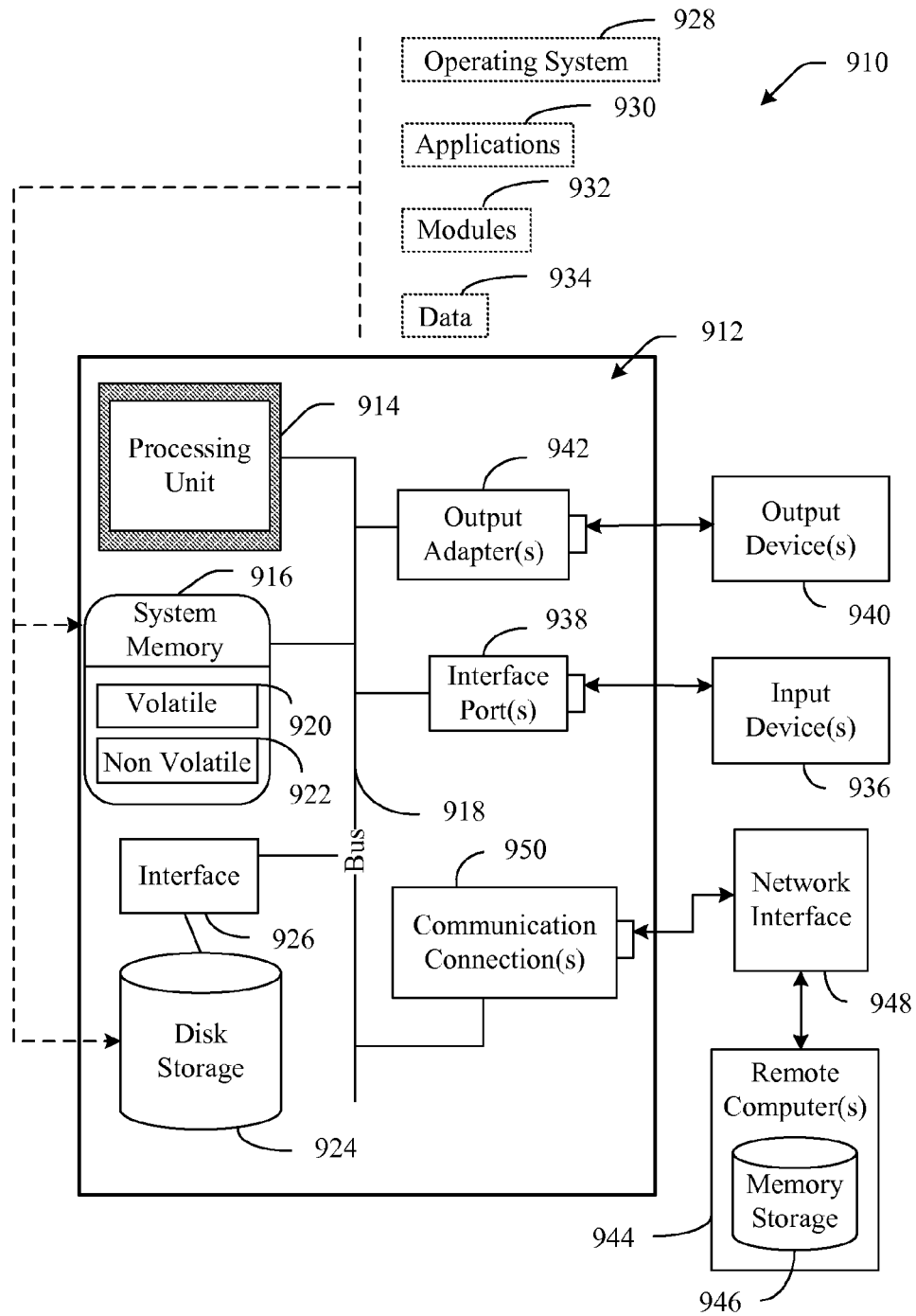
FIG. 9 illustrates an exemplary environment for implementing various aspects of the subject innovation.

FIG. 9 illustrates an exemplary environment 910 for implementing various aspects of the browser component in accordance with an aspect of the subject innovation, which includes a computer 912, as part of the download engine. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Figure 10:
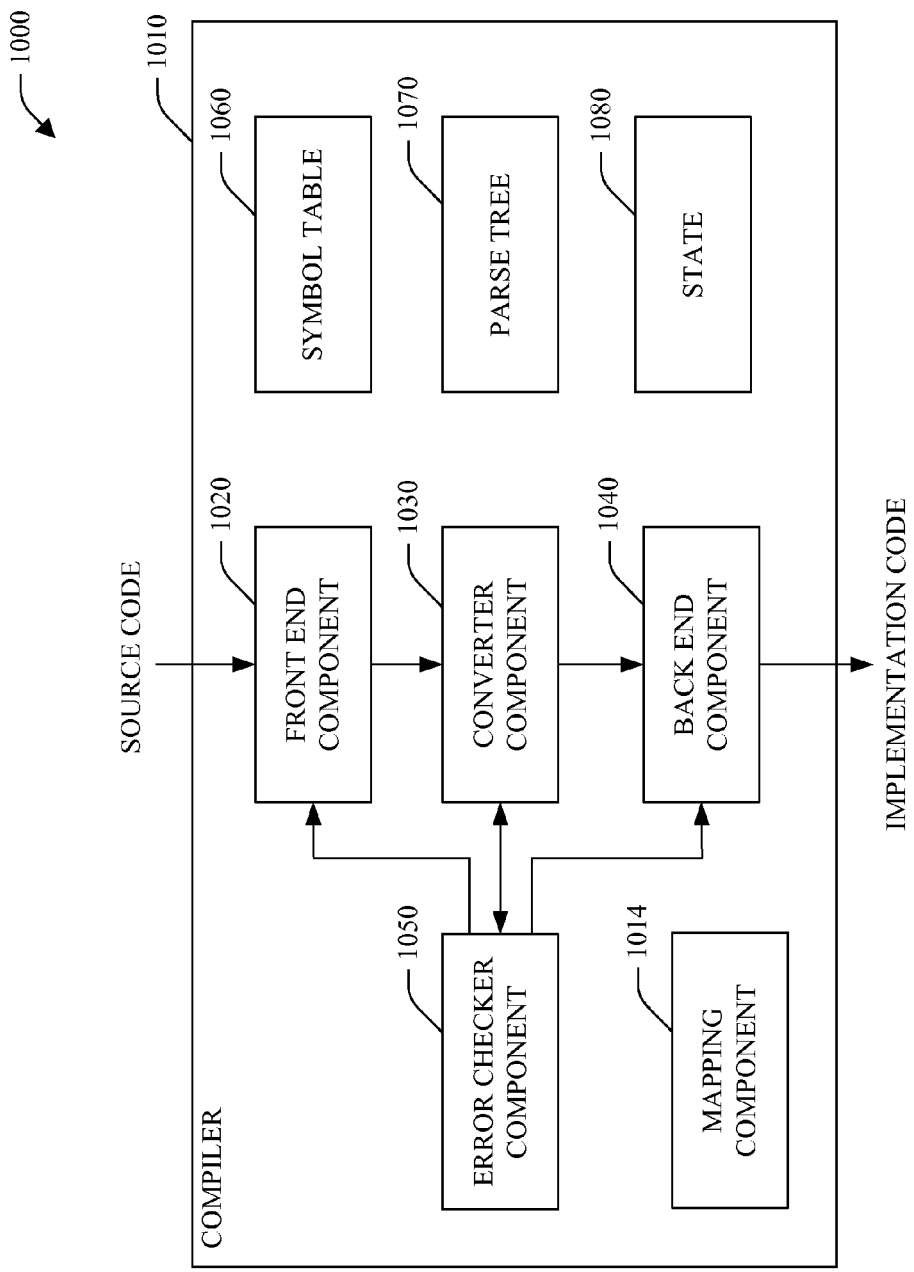
FIG. 10 illustrates a block diagram depicting a compiler environment that can be employed to generate implementation code related to query comprehensions for viewing history data.

FIG. 10 is a block diagram depicting a compiler environment 1000 that can be employed to generate implementation code related to query comprehensions for viewing history data by the browser component (e.g., executable, intermediate language ... ). However, aspects of the environment could also be employed by a background compiler, for instance related to a code editor, to enable intelligent or context sensitive programming assistance to be provided. The compiler environment 1000 includes a compiler 1020 including front-end component 1020, converter component 1030, back-end component 1040, error checker component 1050, symbol table 1060, parse tree 1070, and state 1080. The compiler 1020 accepts source code as input and produces implementation code as output. The input can include but is not limited to query expressions or elements capable of being identified by query expressions including but not limited to query comprehensions and abbreviations as described herein. The relationships amongst the components and modules of the compiler environment 1000 illustrate the main flow of data. Other components and relationships are not illustrated for the sake of clarity and simplicity. Depending on implementation, components can be added, omitted, split into multiple modules, combined with other modules, and/or other configurations of modules.

Compiler 1020 can accept as input a file having source code associated with processing of a sequence of elements. The source code may include query comprehensions and abbreviations, other expressions, associated functions, methods and/or other programmatic constructs. Compiler 1020 may process source code in conjunction with one or more components for analyzing constructs and generating or injecting code.

A front-end component 1020 reads and performs lexical analysis upon the source code. In essence, the front-end component 1020 reads and translates a sequence of characters (e.g., alphanumeric) in the source code into syntactic elements or tokens, indicating constants, identifiers, operator symbols, keywords, and punctuation among other things.

Converter component 1030 parses the tokens into an intermediate representation. For instance, the converter component 1030 can check syntax and group tokens into expressions or other syntactic structures, which in turn coalesce into statement trees. Conceptually, these trees form a parse tree 1070. Furthermore and as appropriate, the converter module 1030 can place entries into a symbol table 1030 that lists symbol names and type information used in the source code along with related characteristics.

A state 1080 can be employed to track the progress of the compiler 1020 in processing the received or retrieved source code and forming the parse tree 1070. For example, different state values indicate that the compiler 1020 is at the start of a class definition or functions, has just declared a class member, or has completed an expression. As the compiler progresses, it continually updates the state 1080. The compiler 1020 may partially or fully expose the state 1080 to an outside entity, which can then provide input to the compiler 1020.

Based upon constructs or other signals in the source code (or if the opportunity is otherwise recognized), the converter component 1030 or another component can inject code to facilitate efficient and proper execution. For example, code can be injected to expand a comprehension abbreviation or translate from a query comprehension to sequence operators. Rules coded into the converter component 1030 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1060 and the parse tree 1070, a back-end component 1040 can translate the intermediate representation into output code. The back-end component 1040 converts the intermediate representation into instructions executable in or by a target processor, into memory allocations for variables, and so forth. The output code can be executable by a real processor, but the invention also contemplates output code that is executable by a virtual processor.

Furthermore, the front-end component 1020 and the back end component 1040 can perform additional functions, such as code optimization, and can perform the described operations as a single phase or in multiple phases. Various other aspects of the components of compiler 1020 are conventional in nature and can be substituted with components performing equivalent functions. Additionally, at various stages during processing of the source code, an error checker component 1050 can check for errors such as errors in lexical structure, syntax errors, and even semantic errors. Upon detection error, checker component 1050 can halt compilation and generate a message indicative of the error.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising a computer processor for executing the following components:
   a plurality of embedded historian components, wherein the plurality of historian components are part of a hierarchically structured data model for with the industrial automation system; and
   a browser component associated with the plurality of embedded historian components that searches the hierarchically structured data model according to a query.

2. The industrial automation system of claim 1, wherein the browser component further comprising a query component that receives the query, wherein the query specifies at least a portion of the hierarchically structured data model based on at least one criteria.

3. The industrial automation system of claim 2, the query component further comprising a translation component that translates the query into an expression specified with operators.

4. The industrial automation system of claim 3, the translation component further comprising an optimization component that manipulates the operators in the expression.

5. The industrial automation system of claim 2, wherein the at least one criteria is at least one of: a type of data or a controller device.

6. The industrial automation system of claim 2, wherein the at least one criteria is at least one location.

7. The industrial automation system of claim 2, wherein the at least one criteria is at least one particular historian.

8. The industrial automation system of claim 1, further comprising a storage medium associated with the plurality of embedded historians that stores the hierarchically structured data model.

9. The industrial automation system of claim 1, wherein the hierarchically structured data model comprises a plurality of nodes that represent a plurality of controller devices associated with the plurality of embedded historians.

10. The industrial automation system of claim 9, wherein the hierarchically structured data model associates data collected by the plurality of embedded historians with at least one record and places the at least one record in a tree data structure.

11. The industrial automation system of claim 1, further comprising a Human Machine Interface (HMI) that graphically displays a view of the industrial automation system according to the query.

12. The industrial automation system of claim 1, further comprising a publish and subscribe component that identifies at least one historian.

13. A method of locating data collected by embedded historians within an industrial plant, comprising:
   collecting data via a plurality of historians embedded within a plurality of industrial units;
   storing the data in a storage medium associated with the plurality of historians based on a hierarchically structured data model;
   searching the data based-on a query submitted to a browser.

14. The method of claim 13, wherein searching the data further comprises searching for data that satisfies the query based upon at least one of: data collected by at least one of the plurality of historians, data of a specific data type or data collected during at least one time period.

15. The method of claim 13 further comprising employing a predetermined display criteria for viewing data that satisfies the query.

16. The method of claim 13 further comprising notifying the plurality of historians regarding persistence of the data.

17. The method of claim 13, further comprising translating the query into an expression specified with operators.

18. The method of claim 13, further comprising defining the hierarchically structured data model for the industrial plant.

19. The method of claim 13, wherein collecting data further comprising collecting the data across two or more levels of the industrial plant.

20. The method of claim 13, wherein collecting data further comprising collecting data in real time.

21. The method of claim 13, further comprising displaying at least a portion of the data that satisfies the query.

22. A computer implemented system, comprising the following computer executable components:
   a plurality of embedded historians distributed throughout an industrial automation system, wherein the plurality of embedded historians store history data according to a hierarchically structured data model for the industrial automation system; and
   a browser component that that searches the history data according to a query of the hierarchically structured data model for the industrial automation system and displays data that satisfies the query.

23. The computer implemented system of claim 22, further comprising a translation component that translates the query into an expression specified with operators.

24. The computer implemented system of claim 22 further comprising a database associated with the plurality of embedded historians, wherein the database services the industrial automation system.

25. The computer implemented system of claim 22, the browser component is part of an application that runs on a control unit of the industrial automation system.

26. The computer implemented system of claim 22, further comprising a publish and subscribe component that identifies one or more of the plurality of embedded historians to the browser component.

27. A method for collecting data related to an industrial process, comprising:
   collecting historical data related to the industrial process;
   storing the data in one of a plurality of embedded historians according to a hierarchically structured data model;

identifying a criteria for browsing the hierarchically structured data model; and browsing the hierarchically structured data model based on the criteria.

28. The method of claim 27, further comprising displaying a graphical view of the hierarchically structured data model.

29. The method of claim 27, browsing the hierarchically structured data model further comprising querying the hierarchically structured data model according to the criteria.

30. The method of claim 27, further comprising representing a plurality of industrial units associated with the industrial process as nodes of the hierarchically structured data model.

* * * * *